United States Patent
Ishfaq et al.

(10) Patent No.: US 9,578,580 B1
(45) Date of Patent: Feb. 21, 2017

(54) CELLULAR HANDOFF BY WIRELESS DEVICES

(71) Applicant: General Motors LLC, Detroit, MI (US)

(72) Inventors: Mohammad Ishfaq, Northville, MI (US); Monil H. Joshi, Windsor (CA); Waqas Haleem, Rochester Hills, MI (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/873,673

(22) Filed: Oct. 2, 2015

(51) Int. Cl.
*H04W 36/30* (2009.01)
*H04W 36/16* (2009.01)

(52) U.S. Cl.
CPC .......... *H04W 36/30* (2013.01); *H04W 36/165* (2013.01)

(58) Field of Classification Search
None
See application file for complete search history.

(56) References Cited

U.S. PATENT DOCUMENTS

| | | | | |
|---|---|---|---|---|
| 8,462,745 B2* | 6/2013 | Alizadeh-Shabdiz | | G01S 5/0263 370/338 |
| 8,755,764 B2* | 6/2014 | Yi | | H04W 76/007 342/357.31 |
| 8,974,873 B2* | 3/2015 | Swager | | C09K 19/12 252/299.01 |
| 9,086,948 B1* | 7/2015 | Slusar | | G06Q 40/08 |
| 9,251,629 B2* | 2/2016 | Kalinadhabhotla | .... | G07C 5/008 |
| 9,301,242 B2* | 3/2016 | Yi | | H04W 60/00 |
| 2012/0286950 A1* | 11/2012 | Peariso | | G08B 13/1427 340/539.1 |
| 2012/0327918 A1* | 12/2012 | Yi | | H04W 56/0045 370/337 |
| 2013/0196670 A1* | 8/2013 | Kim | | H04W 36/0083 455/440 |
| 2014/0135061 A1* | 5/2014 | Rousu | | H04B 1/0064 455/553.1 |
| 2015/0215986 A1* | 7/2015 | Lei | | H04W 76/028 370/329 |

* cited by examiner

*Primary Examiner* — Diane Mizrahi
(74) *Attorney, Agent, or Firm* — Christopher DeVries; Reising Ethington P.C.

(57) ABSTRACT

A system and method of controlling a wireless device communicating with a cellular communications system includes: establishing a cellular connection between the wireless device and a first cell tower; detecting, at the wireless device, a reference signal received power (RSRP) measurement of a signal broadcast by the first cell tower; increasing an RSRP threshold used by the wireless device by adding an offset value to the RSRP threshold; determining whether the detected RSRP measurement of the signal broadcast by the first cell tower falls below the increased RSRP threshold; and initiating a cellular connection with a second cell tower.

10 Claims, 3 Drawing Sheets

CELLULAR HANDOFF BY WIRELESS DEVICES

TECHNICAL FIELD

The present invention relates to wireless cellular communications and, more particularly, to wireless devices moving from one cell to another cell.

BACKGROUND

Cellular communications systems generally support one or more cellular protocols that facilitate wireless connections between wireless devices or user equipment (UE) and cell towers operated by the cellular communications systems. Presently, these cellular communications systems may use earlier cellular protocols, such as 2G (e.g., EDGE) or 3G (e.g., CDMA 2000 and UMTS), and modern cellular protocols sometimes referred to as 4G long-term evolution (LTE). The modern cellular protocols support packet-switched voice and data communications over LTE, such as VoLTE, while the earlier cellular protocols involve circuit-switched cellular communications and do not support VoLTE. Many wireless devices capable of cellular communications are equipped to support operation using 2G, 3G, or 4G LTE cellular protocols.

The cellular system implementing these cellular protocols includes cells or cell towers that are spaced apart from other cell towers by a distance that corresponds to a communication range of handheld wireless devices using low-gain antennas. As a wireless device using a low-gain antenna moves toward the outer boundary or range of one cell, the boundary of another cell is nearby ready to provide service to the wireless device. When the wireless device leaves one cell and enters another, the device ends communication with a first cell tower and begins communicating with a second, adjacent cell tower. These transfers may begin in response to a determination that the wireless device has traveled beyond a communication range or footprint serviced by the first cell. To determine when to begin the transfer from one cell to another, the wireless device can detect the signal quality of the cell tower the device presently uses and decide to switch cells or cell towers when the signal quality falls below a predetermined threshold. At that point, the boundary of another cell meets or slightly overlaps the present cell and is ready to provide cellular service to the wireless device.

However, a number of variables can upset the effective movement of the wireless device between adjacent cells in the cellular system. While the cells may be optimized for wireless devices using low-gain antennas, other wireless devices may use relatively high-gain antennas that permit the wireless devices to receive cellular signals at a greater distance than wireless devices using low-gain antennas. The overlap may also be affected when adjacent cells use different cellular protocols. As cellular systems and individual cells have begun implementing different cellular protocols, the amount of overlap between cells can vary enough to interfere with the transfer of communications between adjacent cells in a cellular system.

SUMMARY

According to an embodiment of the invention, there is provided a method of controlling a wireless device communicating with a cellular communications system. The method includes establishing a cellular connection between the wireless device and a first cell tower; detecting, at the wireless device, a reference signal received power (RSRP) measurement of a signal broadcast by the first cell tower; increasing an RSRP threshold used by the wireless device by adding an offset value to the RSRP threshold; determining that the detected RSRP measurement of the signal broadcast by the first cell tower falls below the increased RSRP threshold; and initiating a cellular connection with a second cell tower.

According to another embodiment of the invention, there is provided a method of controlling a wireless device communicating with a cellular communications system. The method includes establishing a cellular connection between a wireless device equipped with a high-gain antenna and a first cell tower providing service using a modern cellular protocol; detecting, at the wireless device, an RSRP measurement of a signal broadcast by the first cell tower; increasing an RSRP threshold used by the wireless device by adding an offset value to the RSRP threshold; determining that the detected RSRP measurement of the signal broadcast by the first cell tower falls below the increased RSRP threshold; and initiating a cellular connection with a second cell tower providing service using an earlier cellular protocol.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
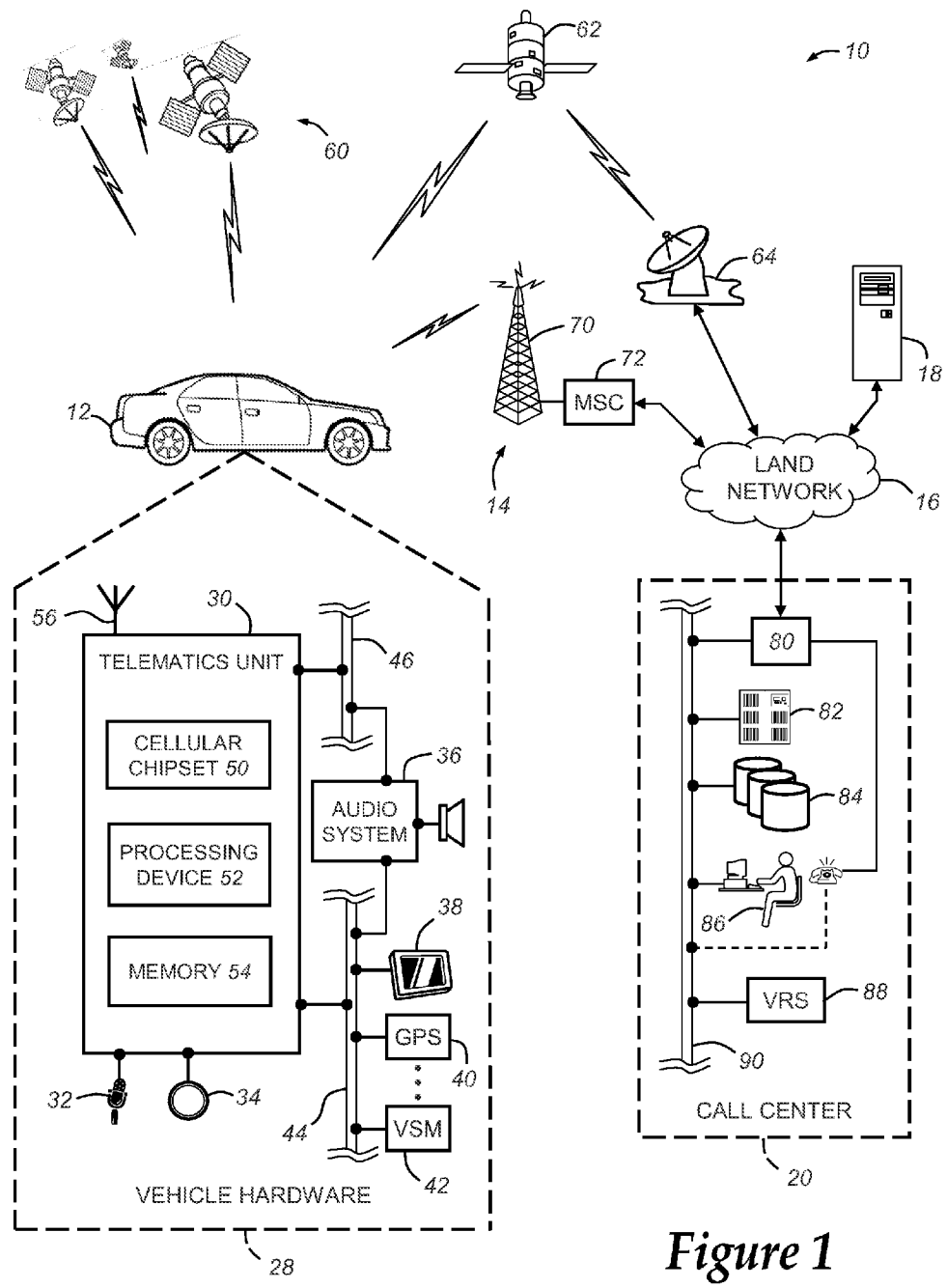
FIG. 1 is a block diagram depicting an embodiment of a communications system that is capable of utilizing the method disclosed herein.

The system and method described below involves a wireless device as it moves from one cell to another cell within a cellular communication system. The wireless device may remain in communication with one of the cells after a point when it should have begun communicating with a different cell. Cells or cell towers within a cellular system may be spaced apart so that they optimally serve handheld cellular devices. The wireless device can determine the power or quality of the signal broadcast by the cell it currently is registered with. So long as the power or quality of the signal broadcast by the current cell is above a predetermined value, the wireless device may choose to remain registered with or "camped on" that cell.

Some wireless devices are equipped with antennas having a higher gain than those used with handheld cellular telephones. For example, vehicles equipped with vehicle telematics units can use a roof-mounted antenna that has a higher gain relative to an antenna used by handheld cellular telephones. Cellular chipsets used in wireless devices with a high gain antenna can remain registered with a cell long after the wireless device should have registered with a new cell. The wireless device may use a cellular chipset that is preprogrammed with the predetermined power or signal value. Even though the wireless device has left a cell, the wireless device using a high-gain antenna may mistakenly believe it remains in the cell based on a power level of the signal broadcast by the cell and detected using the high-gain antenna that is compared with the preprogrammed power or signal value. When the measure signal power finally falls below the predetermined power level preprogrammed in the cellular chipset, the wireless device may have missed its window to transfer communication to a new cell by moving too far from the boundary of the new cell. Such a condition can result in dropped communication sessions at the wireless device as it may not be able to register with the new cell in a way that communications are continued from the old cell to the new cell. This problem may be particularly acute when wireless devices transition from a cell providing service using a modern cellular protocol, such as 4G, to a cell providing service using earlier cellular protocols, such as 2G or 3G.

Wireless devices can compensate for variations in detected signal power by including an offset with the predetermined power level the cellular chipset consults when determining whether the device has left a cell. For instance, the wireless device may measure a reference signal received power (RSRP) signal or a reference signal received quality (RSRQ) signal and compare it to a predetermined RSRP/RSRQ threshold. In configurations known to have antennas that are different from those commonly used by handheld wireless devices, the RSRP/RSRQ threshold can be modified by adding an offset value that can trigger the wireless device to initiate registration with a different cell sooner than it would if relying solely on the RSRP signal.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone/communication system that includes a plurality of cell towers 70 (only one of which is shown in FIG. 1), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular communications system 14 can implement any suitable communications technology, including for example, earlier cellular protocols such as AMPS, or modern cellular protocols such as 4G (e.g., LTE). As used herein, the term "modern cellular protocol" should be understood to refer to a cellular or wireless communication standard defined by the 3GPP consortium and capable of supporting VoLTE. Modern cellular protocols include not only LTE or 4G LTE cellular protocols as they are defined by the 3GPP consortium and outlined in release 8 and 9 (e.g., HSPA+) but also more advanced implementations of LTE sometimes referred to as LTE Advanced, WiMAX-Advanced, or "True 4G." The phrase "earlier cellular protocol" generally refers to cellular protocols that do not support VoLTE, such as 3G or other circuit-switched wireless communications standards for cellular communication that were developed by 3GPP and 3GPP2 prior to LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
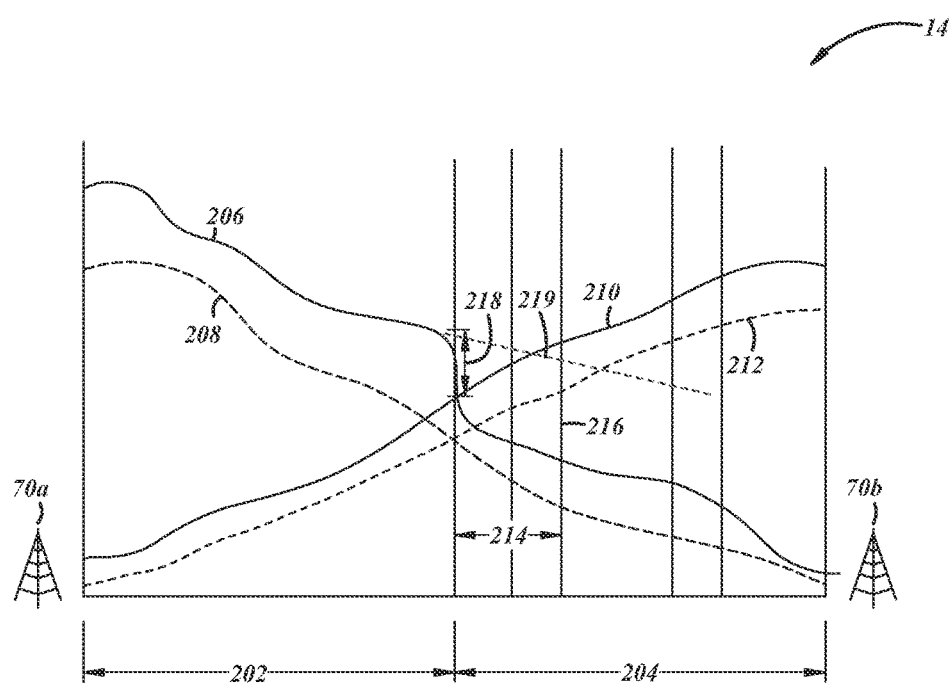
FIG. 2 is a block diagram depicting an embodiment of a wireless carrier system.
Figure 3:
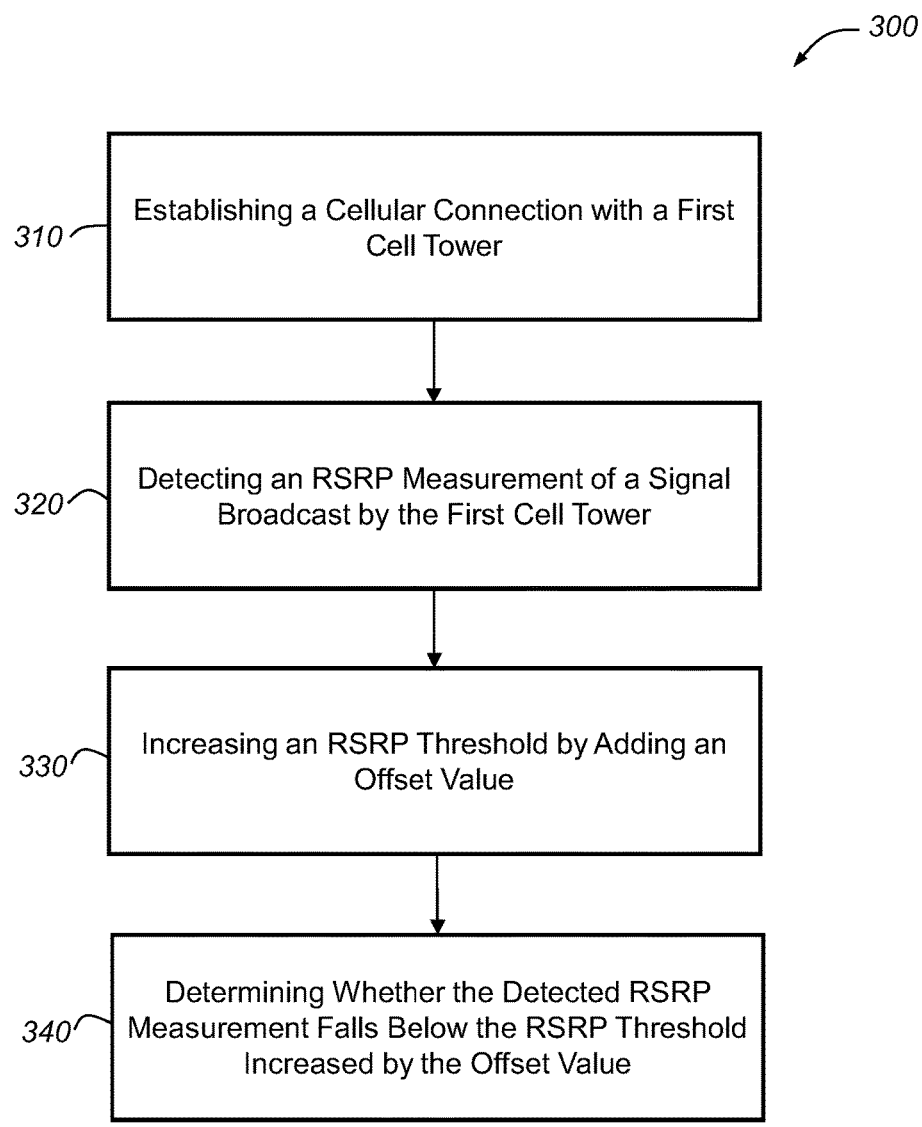
FIG. 3 is a flow chart depicting an embodiment of a method of controlling a wireless device communicating with a cellular communications system.

Turning now to FIGS. 2-3, there is shown an exemplary embodiment of a portion of the wireless carrier system 14 shown in FIG. 1 and a method 300 of controlling a wireless device communicating with the wireless carrier system 14. In this example, the wireless device will be described with respect to a vehicle telematics unit 30 but it should be apparent that the method 300 can be used with other wireless device configurations. FIG. 2 depicts communications from the vehicle telematics unit 30 registered with and moving away from a first cell tower 70a as the unit 30 moves toward a second cell tower 70b. In this implementation, the first cell tower 70a provides cellular service using a modern cellular protocol whereas the second cell tower 70b provides service using an earlier cellular protocol. Specifically, the first cell tower 70a provides service using 4G LTE and the second cell tower 70b provides service using 3G.

Each of the cell towers 70a and 70b include cellular areas that define geographic regions surrounding the cell towers 70a and 70b. The cell towers 70a and 70b each provide cellular communications services within the geographic regions. A first cell tower area 202 and a second cell tower area 204 are geographic areas belonging to the first cell tower 70a and the second cell tower 70b, respectively. The signal broadcast by the first cell tower 70a is depicted as having a power level being within a first upper band 206 (shown as a solid line) and a first lower band 208 (shown as a segmented line). Similarly, the signal broadcast by the second cell tower 70b is shown having a power level between an upper band 210 (solid line) and a lower band 212 (segmented line). The power of the signals defined by the upper and lower bands increase as the vehicle telematics unit 30 approaches the cell tower and decrease as the unit 30 travels further away from the cell tower.

The vehicle telematics unit 30 is capable of measuring the reference signal received power (RSRP) or the reference signal received quality (RSRQ) of the signal broadcast by the first cell tower 70a or the second cell tower 70b. These measured values can trigger the vehicle telematics unit 30 to take action with respect to cell towers in the wireless carrier system 14. And the actions or events may generally be labeled with a letter and a number. These events are described by the 3GPP standards. For example, an A2 event can indicate that the RSRP of the first cell tower 70a measured by the vehicle telematics unit 30 has become lower than the measured RSRP of the second cell tower 70b. A B2 event can indicate that the RSRP of the first cell tower 70a falls below an RSRP threshold, which can initiate the vehicle telematics unit 30 to end its registration or communication with the first cell tower 70a and register or begin communication with the second cell tower 70b.

Near the edge of the first cell tower area 202 and the second cell tower area 204, where these two areas meet or overlap, the upper band 206 of the first cell tower 70a should become equal to or less than the upper band 210 of the second cell tower 70b to initiate a transition from the first cell tower 70a to the second cell tower 70b. However, when a wireless device is equipped with a relatively high-gain antenna—such as the vehicle telematics unit 30 and antenna 56—the upper band 206 of the signal from the first cell tower 70a may be elevated relative to what would be expected if the signal were measured using a low-gain antenna. The amount the upper band 206 of the first cell tower 70a is elevated relative to a wireless device using low-gain antenna can be defined by the difference between the upper band 206 of the first cell tower 70a and the upper band 210 of the second cell tower 70b when each signal is measured at a location where the first cell tower area 202 and the second cell tower area 204 meet or slightly overlap. This difference can be described as an offset 218 or an offset value between the upper band 206 and the upper band 210 and will be discussed below in more detail. It is also possible in some implementations to determine the difference or offset 218 using the first lower band 208 and the second lower band 212.

Within each of the cell tower areas 202 and 204, a number of subareas exist. For example, an outer edge of the second cell tower area 204 can be described as a triggering area 214. The triggering area 214 can be located within the second cell tower area 204 where the second cell tower 70b is receptive to establishing communications with the vehicle telematics unit 30. A triggering boundary 216 exists apart from the outer edge of the second cell tower 70b and can define a boundary of the triggering area 214 within the second cell tower area 204. The vehicle telematics unit 30 should register or establish communications with the second cell tower 70b before passing the triggering boundary 216. If the vehicle telematics unit 30 travels toward the second cell tower 70b and crosses the triggering boundary 216, the unit 30 may not be able to register or communicate with the second cell tower 70b without dropping a call or otherwise interrupting single radio voice call continuity (SRVCC).

Turning to FIG. 3, it depicts a method 300 of controlling a wireless device communicating with the wireless carrier system 14 and will be described with reference to the features and elements shown in FIGS. 1-2 and discussed above. The method 300 begins at step 310 by establishing a cellular connection between the vehicle telematics unit 30 and the first cell tower 70a. As the vehicle 12 moves within an area serviced by the wireless carrier system 14, the vehicle telematics unit 30 can register or communicate with a first cell tower 70a operated by the system 14. While the vehicle 12 is located within the first cell tower area 202, the vehicle telematics unit 30 can carry out cellular communications using the tower 70a. The method 300 proceeds to step 320.

At step 320, the RSRP measurement of a signal broadcast by the first cell tower is detected at the vehicle telematics unit 30. The vehicle telematics unit 30 can measure the RSRP of the signal broadcast by the first cell tower 70 and the second cell tower 70b. As discussed above, the vehicle telematics unit 30 can compare the RSRP measurements of the first cell tower 70a and the second cell tower 70b and also compare the RSRP measurements to an RSRP threshold. While the vehicle telematics unit 30 is camped on or registered with the first cell tower 70a, the RSRP of the signal broadcast by the first cell tower 70a should be larger than the RSRP of the signal broadcast by the second cell tower 70b. However, when the RSRP of the first cell tower 70a falls below the RSRP of the second cell tower 70b, and also falls below the RSRP threshold, the unit 30 can decide to register or communicate with the second cell tower 70b. The method 300 proceeds to step 330.

At step 330, an RSRP threshold used by the vehicle telematics unit 30 is increased by adding the offset 218 to the RSRP threshold. The RSRP threshold can be a signal strength value that at least partly causes the vehicle telematics unit 30 to register or begin communicating with the second cell tower 70b. The value of the RSRP threshold may be optimized for use with a handheld wireless device or a wireless device configured with a relatively low-gain antenna. As a result, the RSRP threshold can be set so that the wireless device using the low-gain antenna can end communications with the first cell tower 70a and begin communications with the second cell tower 70b when the device leaves the first cell tower area 202 and enters the second cell tower area 204. But the vehicle telematics unit 30 using a relatively high-gain antenna may measure a RSRP value for the upper band 206 that is above the RSRP threshold even though the vehicle 12 has entered the second cell tower area 204. To ensure that the vehicle telematics unit 30 begins registration or communication with the second cell tower 70b before the vehicle 12 passes the triggering boundary 216, an offset 218 can be added to the RSRP threshold. The offset can be calculated as a value that, when added to the RSRP threshold, causes the vehicle telematics unit 30 to initiate registration or communication with the second cell tower 70b where the first cell tower area 202 and the second cell tower area 204 meet or slightly overlap or before the vehicle 12 passes the triggering boundary 216. The RSRP as would be measured without the offset 218 can be appreciated by the segmented line 219. The line 219 depicts an RSRP measurement that is larger than the upper band 210 for a significant portion of the triggering area 214. Without using the offset 218, the vehicle telematics unit 30 may not register with the second cell tower 70b in a timely manner. The method 300 proceeds to step 340.

At step 340, the vehicle telematics unit 30 determines whether the detected RSRP measurement of the signal broadcast by the first cell tower 70a falls below the increased RSRP threshold; that is below the sum of the original RSRP threshold plus the offset 218. If so, the vehicle telematics unit 30 initiates a cellular connection with the second cell tower 70b. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

Other terms are to be construed using their broadest reasonable meaning unless they are used in a context that requires a different interpretation.

The invention claimed is:

1. A method of controlling a wireless device communicating with a cellular communications system, comprising the steps of:
   (a) establishing a cellular connection between the wireless device and a first cell tower;
   (b) detecting, at the wireless device, a reference signal received power (RSRP) measurement of a signal broadcast by the first cell tower;
   (c) increasing an RSRP threshold used by the wireless device by adding an offset value to the RSRP threshold;
   (d) determining that the detected RSRP measurement of the signal broadcast by the first cell tower falls below the increased RSRP threshold; and
   (e) initiating a cellular connection with a second cell tower in response to step (d).

2. The method of claim 1, wherein the wireless device further comprises a vehicle telematics unit.

3. The method of claim 1, wherein the offset value is set to a value that causes the wireless device to register with the second cell tower before passing a triggering boundary.

4. The method of claim 1, wherein the wireless device communicates using a high-gain antenna.

5. The method of claim 1, wherein the first cell tower provides cellular service via a modern cellular protocol and the second cell tower provides cellular service via an earlier cellular protocol.

6. The method of claim 5, wherein the modern cellular protocol is a 4G cellular protocol.

7. A method of controlling a wireless device communicating with a cellular communications system, comprising the steps of:
   (a) establishing a cellular connection between a wireless device equipped with a high-gain antenna and a first cell tower providing service using a modern cellular protocol;
   (b) detecting, at the wireless device, a reference signal received power (RSRP) measurement of a signal broadcast by the first cell tower;
   (c) increasing an RSRP threshold used by the wireless device by adding an offset value to the RSRP threshold;
   (d) determining that the detected RSRP measurement of the signal broadcast by the first cell tower falls below the increased RSRP threshold; and
   (e) initiating a cellular connection with a second cell tower providing service using an earlier cellular protocol in response to step (d).

8. The method of claim 7, wherein the wireless device further comprises a vehicle telematics unit.

9. The method of claim 7, wherein the offset value is set to a value that causes the wireless device to register with the second cell tower before passing a triggering boundary.

10. The method of claim 7, wherein the modern cellular protocol is a 4G cellular protocol.

* * * * *